United States Patent [19]

McKeown

[11] Patent Number: 5,206,638
[45] Date of Patent: Apr. 27, 1993

[54] METHOD AND APPARATUS FOR EXCHANGING DATA WITHIN A DIGITAL COMMUNICATIONS SYSTEM

[75] Inventor: Nicholas McKeown, Berkeley, Calif.

[73] Assignee: Hewlett-Packard Company, Palo Alto, Calif.

[21] Appl. No.: 647,591

[22] Filed: Jan. 28, 1991

[30] Foreign Application Priority Data

Jan. 30, 1990 [EP] European Pat. Off. ........... 90101759

[51] Int. Cl.$^5$ ............................................. H04Q 1/00
[52] U.S. Cl. ........................... 340/825.510; 340/825.5; 370/85.2
[58] Field of Search ........... 340/825.51, 825.5, 825.05, 340/825.2, 825.21, 825.14; 370/85.1, 85.2, 85.3, 85.4, 85.5, 85.7, 94.3, 95.1, 103, 108; 375/118, 109; 342/88

[56] References Cited

U.S. PATENT DOCUMENTS

| | | | |
|---|---|---|---|
| 4,562,573 | 12/1985 | Murano et al. | 370/85.1 |
| 4,606,023 | 8/1986 | Dragoo | 370/94.3 |
| 4,761,799 | 8/1988 | Arragon | 370/103 |
| 4,813,012 | 3/1989 | Valeri et al. | 340/825.5 |
| 4,937,819 | 6/1990 | King | 370/95.1 |

FOREIGN PATENT DOCUMENTS

0255442A2 3/1988 European Pat. Off. .

OTHER PUBLICATIONS

IBM Technical Disclosure Bulleting, vol. 32, No. 5B Oct. (1989).

Primary Examiner—Donald J. Yusko
Assistant Examiner—Edwin C. Holloway, III

[57] ABSTRACT

A Communications system having a protocol whereby a plurality of stations (100) are granted access to a network. Each station may send a packet of data in each cycle of operation. At least one station with data to transmit identifies the station that immediately precedes it among stations which are to transmit data (e.g., as indicated in a corresponding reservation slot). On the basis of that identification the one station transmits its data packet promptly after the preceding station has begun transmitting its data packet. At least in same cases the one station initiates its transmission prior to having finished receiving the packet transmitted by the preceding station at a time calculated to avoid data collision.

26 Claims, 6 Drawing Sheets

METHOD AND APPARATUS FOR EXCHANGING DATA WITHIN A DIGITAL COMMUNICATIONS SYSTEM

FIELD OF THE INVENTION

The present invention relates to communications systems. More particularly, the present invention relates to a digital communications system between a plurality of stations. The present invention is particularly but not exclusively applicable to systems in the form of a star in which peripheral stations are connected either directly or indirectly to a central node.

BACKGROUND OF THE INVENTION

Any communications system (e.g., computer network) must utilize a protocol for determining the sequence and nature of the permitted communications over the system. In the past, protocols for star networks have generally been those which were developed for other networks such as rings or buses. For example, it is known to operate star networks on the basis of token passing protocols that were originally developed for ring networks. With such protocols, a logical "token" is passed from station to station and any station "holding" the token is allowed to transmit data. A disadvantage of token passing protocols is that the gap (measured in bits) between the end of transmission by one station and the beginning of transmission by the next station to receive the token increases with the data rate. This overhead, due to passing the token, places both a lower bound on the access delay and an upper bound on the efficiency of utilization of the system, and, in addition, limits the efficiency under low loading. Thus, token passing protocols are not efficient on a star network.

Star networks have also been operated using random access protocols, such as CSMA/CD (Carrier Sense Multiple Access/Collision Detect). However, with such protocols, the minimum length of a transmission by a station must increase with the data rate, and this produces inefficiency. An increase in data rate is not compensated for by a reduction in access delay, since the number of "collisions" between data from different stations will remain approximately constant.

Another known type of protocol for broadcast communications systems is the so-called "bit-map" protocol. Bit-map protocols have previously been used, for example, in packet radio systems. Typically, in a bit-map protocol the stations reserve the use of subsequent slots in an operating cycle by setting an appropriate bit in a reservation field (or bit-map). The stations thereafter use their reserved slots to transmit data. As the stations are part of a broadcast system, the bit-map is available to all stations to enable them to judge when they should transmit their data during the main part of the operating cycle.

It is also known to have two transmissions present at the same time on different branches of a tree-configured telephone network. In the known arrangement, the local telephone exchange determines the distance from the exchange of each user and then asks each user to transmit its data at a time calculated to avoid collisions with other users, but possibly at a time that results in more than one transmission being simultaneously present on the network. This system, however, is based upon a central intelligence that is not employed in systems of the type to which the present invention is directed, i.e., systems in which each station has its own intelligence.

An object of the present invention is to provide a communications system employing a modified bit-map protocol that can be used to advantage in a star network. It is a further object of the present invention to provide a communication system employing a modified bit-map protocol that can be used to advantage in network topologies other than star topologies. It is a still further object of the present invention to provide a communication system whereby more than one transmission can be present on the network at a time. The present invention achieves these goals.

SUMMARY OF THE INVENTION

A communications system according to the present invention is arranged to operate in cycles. The system comprises a plurality of stations interconnected by transmission paths, each station being permitted to transmit data during each cycle in a predetermined order of permitted transmissions. Each data transmission includes identity information indicative of the identity of the transmitting station.

According to the invention, at least one of the stations comprises first means for determining whether it is a first station in a sequence of stations with data to transmit in a given cycle; and second means for determining when it (the station) is a next station with data to transmit, including means for receiving data transmissions and identifying an originating station, and means for transmitting data at a time before it has finished receiving data from an immediately preceding station in the order of permitted transmissions. The time is judged by the station to avoid its data transmission colliding at any other station with a data transmission from the immediately preceding station.

In a preferred embodiment of the invention, the second means includes means for ascertaining the time to the end of data reception from the immediately preceding station; and means for initiating transmission of data at a time preceding the end of data reception by an amount of time no greater than the time $t = t_1 + t_0 + t_2$, where:

$t_1$ is the time required for data transmitted by the at least one station to travel from the at least one station along an outward transmission path to a common path used by the immediately preceding station in transmitting its data to all other stations but the at least one station;

$t_2$ is the time required for data transmitted by the immediately preceding station to travel from the common path to the at least one station along an inward transmission path; and $t_0$ is the time required for data transmitted by the immediately preceding station to travel from the outward path to the inward path along the common path, t: being negative when the data transmitted from the immediately preceding station reaches the outward path before the inward path.

In a most preferred embodiment, each station is arranged to transmit a fixed amount of data during each cycle that it transmits data. In this embodiment the at least one station further comprises means for determining the progress of reception of data from the immediately preceding station. The time to initiate transmission is ascertained on the basis of the progress and a prior knowledge of the size of the fixed amount of data.

If the amount of data transmitted by the stations during a cycle is variable, the stations are programmed, when transmitting data, to include an indicator of the amount of data being transmitted. In this case, the at least one station further comprises, in accordance with the invention, means for determining the progress of reception of data from the immediately preceding station. The time to initiate transmission is ascertained on the basis of the progress and the indicator of the amount of data being transmitted.

In another embodiment of the invention, the plurality of stations are interconnected in a star network via a central node. In this embodiment, the at least one station initiates transmission of its data at a time preceding the end of reception of data from a preceding station by an amount of time no greater than the round trip time required for data transmitted from itself (i.e., the at least one station) to return to itself via the central node.

In a communications system in accordance with the present invention, two data transmissions may exist on the network at a given time. This permits an increase in efficiency over systems where only one transmission can validly exist at a time. Certain existing protocols for ring or dual-bus networks provide for the co-existence of two or more transmissions on the network at the same time; however such protocols rely on the inherent characteristics of these topologies and cannot be readily transferred for use with other topologies, such as star topologies. In contrast, the present invention is suitable for use with star networks.

DETAILED DESCRIPTION OF THE PREFERRED EMBODIMENTS

Figure 1:
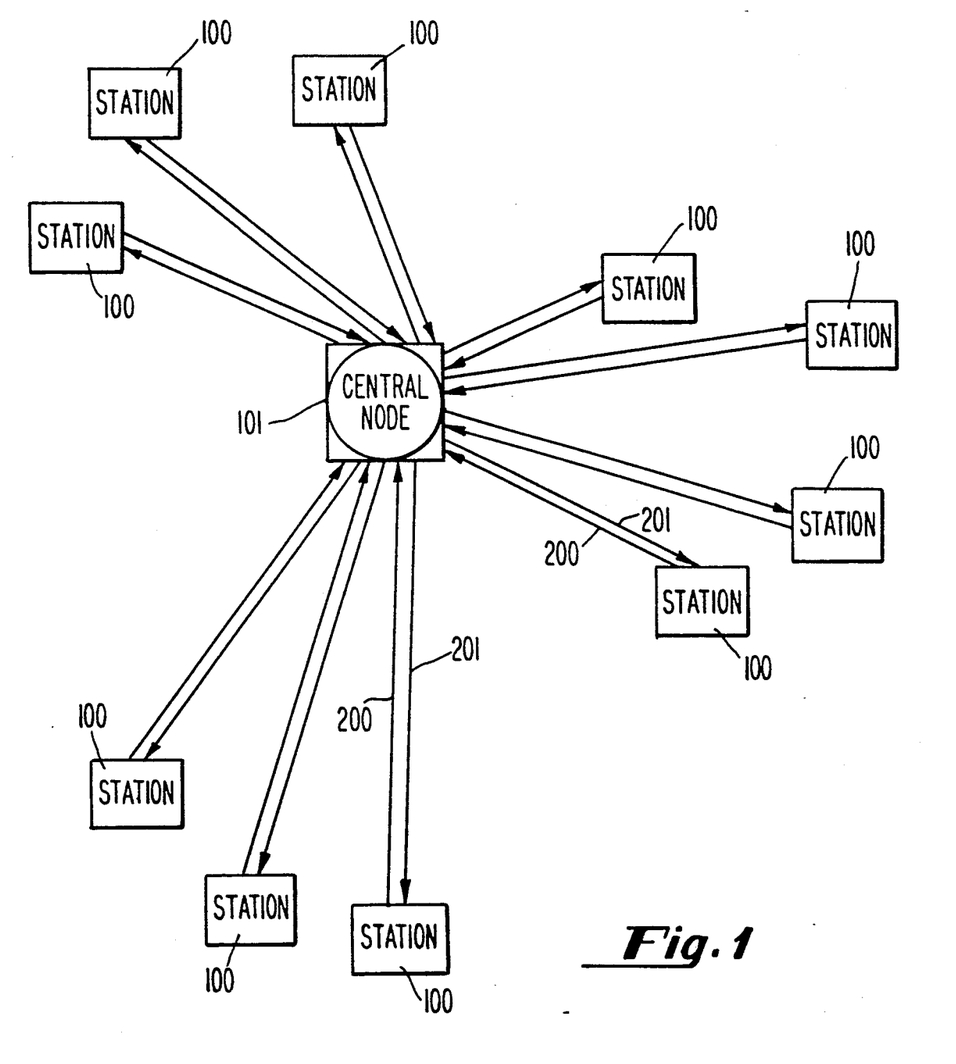
FIG. 1 is a block diagram of a star network.

Referring now to FIG. 1, a star network comprises a plurality of stations 100 connected to a central node 101. Each of the stations 100 may be, for example, a digital computer. The network shown in FIG. 1 may be, for example, a passive optical star network with a passive star node 101 of the general form shown in FIG. 6A. The node 101 of FIG. 6A has a plurality of input lines 200 coming from the stations 100 and a plurality of output lines 201 leading to the stations 100. A signal on any one of the input lines 200 will be distributed to all output lines 201.

Passive optical star networks have important advantages over active star, ring, or bus networks. For example, although the passive star network has a potential single point of failure (at the central passive star coupler node 101) it requires no power, is immune to electromagnetic interference, and has no mechanical or electrical components. It is therefore extremely reliable and does not need optical transceivers, switches or cables. Furthermore, by reducing the number of optical components, passive star optical networks may be constructed more cheaply than other optical networks. Additionally, many localized applications suit a star topology better than a bus or ring topology. For example, it is frequently the case that each user of a network, or work group, is connected to a central wiring point, e.g., for power. The present invention is therefore particularly applicable to passive optical star networks, although it is also applicable to passive electrical star networks, active star networks and other topologies.

According to the present invention, as applied to the star network shown in FIG. 1, the network operates in a succession of cycles. During each cycle, each station 100 is permitted to transmit one data packet through the network, with the order of permitted transmission among the stations in each cycle being predetermined. The stations 100 time their transmissions so as to avoid packet collisions at the receiving stations. Since the primary potential point of collision of such data packets is central node 101, it is the time of arrival of the packets at central node 101 which is best examined when determining how to avoid data collisions.

One possible scheme for avoiding data collisions is for the next-to-transmit station, in the sequence of stations with data to transmit in a given cycle, to begin its transmission only after it has determined that the immediately preceding station in the sequence has completed its transmission. However, since there is inevitably a delay between transmission of a data packet by a station 100 and its reception at the central node 101, waiting until the end of transmission by the immediately-preceding station is inefficient (it should be noted that the distances between the stations 100 and the central node 101 may be more than a kilometer, thus the delay times could become significant).

According to the present invention, each of the stations 100 is arranged so that, when it has data to transmit, it will start transmitting prior to the end of receipt of the packet sent by the station immediately preceding it in the sequence by an amount of time judged to just avoid collision at the central node 101. In the simple network of FIG. 1, this amount is just less than the round trip time between the station 100 whose turn it is to transmit and central node 101. To implement this scheme, each station is programmed to measure how far it is (in terms of transmission time) from the central node 101.

The round trip delay time is dependent on the electronics of the system, the fiber optic transmitter, the fiber itself, and any intermediate optical couplers (not shown). While it may be possible to accurately control the length of the fiber, the delay tolerance through the other components cannot be known to an accuracy of one bit time (i.e., the travel time required for one bit). However, it is feasible for a station to measure within a certain tolerance how many bit times it is from the central node 101.

Figure 2:
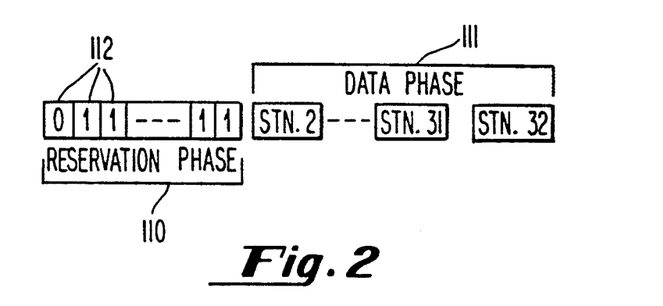
FIG. 2 depicts one cycle of operation of a system according to the present invention.

The format of one cycle according to the present invention is shown in FIG. 2. The cycle is made up of two phases, a reservation phase 110 and a data phase 111. The reservation phase 110 is notionally divided into a plurality of reservation time slots 112, the number of reservation slots corresponding to the number of stations. Since the stations 100 operate in a predetermined order, there is a "first" station of the cycle, a "second" station of the cycle, etc., up to an nth station. There is thus a corresponding number of reservation slots 112, and each station may generate an indication bit in its corresponding reservation slot indicating that it is to transmit a packet in that cycle. This indication is depicted by a logic "1" in FIG. 2, with a contrary indication being depicted by logic "0". A "1" in a reservation slot reserves a time slot in the data phase of the cycle during which the corresponding station may transmit data.

In theory, reservation slots 112 could be only one bit wide if the stations 100 could determine exactly when a signal transmitted was received at central node 101. In practice this is not possible, and the notional width of each reservation slot is therefore of a predetermined window length, which window length is determined by the uncertainties in the transmission. In practice, the measurement accuracy of signal propogation time is limited to about 5 to 6 bits; thus, the window length may be approximately 10 bits, the bit length being determined by a carrier of, e.g., a train of square waves transmitted around the system. In order to provide a "1" indication in a reservation slot 112, a station may apply a pulse to the square wave for more than one bit, for example 2 to 3 bits. This corrupts the square wave signal and this can be detected by standard methods by the other stations.

After the reservation phase 110, the cycle proceeds with its data phase 111. During data phase 111, each station which has reserved a slot during reservation phase 110 transmits a packet of data, the transmission of packets being determined by the ordering of the stations.

By knowing the predetermined order of station transmissions within a cycle, and by monitoring the setting of the reservation slots, each station can determine which station, if any, in the sequence of stations that are to transmit a packet immediately precedes the station in question. When a station determines it is the first station in the sequence of stations with data to transmit, it can commence its transmission. All other stations in the sequence must monitor the data transmitted over the network and, upon receiving the packet from the immediately preceding station in the sequence, transmit its data packet so as to be promptly received at the central node after the end of the packet from the preceding station. This assumes that each data packet carries an indicator of its originating station; however, this is standard practice in packet-based networks. Additionally, the station must have prior knowledge of the length of a packet so that it can judge when the packet from the immediately preceding station will end and then time the start of its transmission accordingly. Where the packets are of fixed length, it is easy for each station to calculate from the start of the packet when it will end, and time its own transmission of a packet accordingly. However, if variable length packets are used, later stations in the cycle must determine from information in the packet itself when it will end; i.e., the packet itself must contain information about its length.

It should be noted that there is a minimum packet length, or slot length, $F_{min}$. This minimum slot length is equal to the maximum propagation delay between the stations 100 and the central node 101. If a station transmits a packet shorter than the minimum slot length, the time difference may be wasted, because the station next to transmit may not be able to detect the end of that packet sufficiently rapidly.

The minimum slot length $F_{min}$ is determined by the maximum length of the link from any of the stations to the central node $L_{max}$, the bit rate B, and the propagation speed C along the transmission path of the star network.

$$F_{min} = \frac{2BL_{max}}{C}$$

If the packets lengths are variable, a header of length H will be required in addition to the minimum slot length, as well as the time $L_{read}$ taken by the stations to interpret the packet length. The effective minimum slot length then:

$$F_{min} = \frac{2BL_{max}}{C} + H + L_{read}$$

In practice, there must also be a delay between the end of the reservation phase and the start of the first packet within the data phase, and this must be at least twice $L_{max}$.

Figure 3:
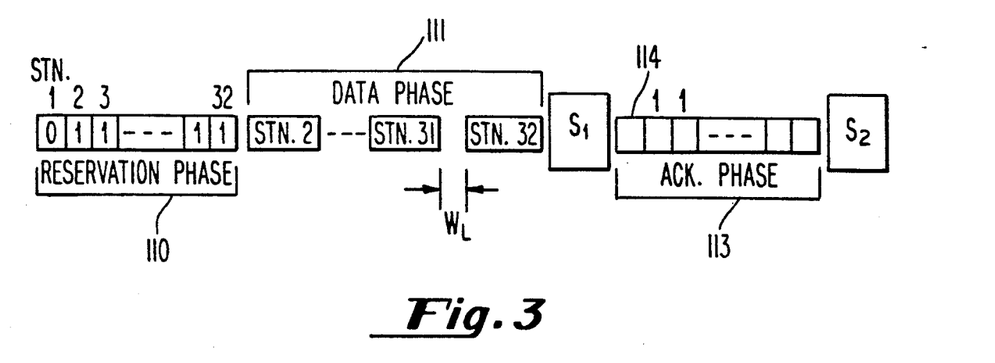
FIG. 3 shows a second alternative cycle of a system according to the present invention.

The cycle shown in FIG. 2 may be further developed, as shown in FIG. 3. In this case, the cycle still contains a reservation phase 110 and a data phase 111, but further contains an acknowledgement phase 113. The acknowledgement section 113 notionally contains acknowledgement slots 114, there being as many acknowledgement slots 114 as there are stations. It can also be seen that the acknowledgement phase 113 is separated from the data phase 111 by a delay $S_1$. The delay $S_1$ must be sufficient to give the recipient of the last packet long enough to reply in the next acknowledgement slot 114. Furthermore, if only the first station transmits in a cycle, then $S_1$ must be greater than $F_{min}$. In practice, $S_1$ must be greater than the lower limits just stated as the recipient must have time to check the validity of the packet.

Similarly, there is a delay $S_2$ after the end of the acknowledgement phase 113 and before the next cycle can start. This delay gives a station long enough to reserve a slot in the next cycle if the packet which is applied to the cycle just ending was not acknowledged. If the ordering of the acknowledgement slots 114 is the same as the ordering of the reservation slots 112, then $S_2 > F_{min} - NW_L$ where $W_L$ is the window length between the data packets and N is the number of packets. To acknowledge receipt of a data packet, the station receiving that data packet determines from the data packet which station applied the packet to the cycle and sets an indication in the acknowledgement slot 114 corresponding to the originating station. The originating station may thus determine whether the packet has been successfully transmitted by checking the indication in its own acknowledgement slot.

As was mentioned above, reservations may be determined by a square wave signal applied to the network. In the arrangement shown in FIG. 3, this can be readily achieved by having the last station to transmit apply a square wave to the cycle after the end of transmission of its data packet. This square wave transmission is maintained for the acknowledgement phase 113 and the reservation phase 110 of the next cycle and is terminated at the start of the transmission of a data packet in the next cycle. The setting of the slots is then achieved by the corruption of the square wave signal. In practice, it may be simplest to arrange for the square wave to be generated by the last station in the predetermined order rather than the last station actually to transmit in a cycle.

When a station does not set a "1" indication in its reservation slot, it cannot transmit data in that cycle. Since the cycle length is primarily determined by the data phase 111 (the relative length of the reservation phase 110 and the acknowledgement phase 113 being very much shorter), it can be seen that if one of the early stations in the predetermined order realizes soon after the reservation phase 110 has passed that it has data to transmit, it must wait for one whole cycle. However, if a station near the end of the predetermined order realizes it has data to transmit at a similar point in the cycle, it must wait for nearly two cycles before it can transmit its packet (i.e., one whole cycle plus that part of a cycle occupied by the data packets of the preceding stations in the next cycle). There is thus a variation in the access delay from one station to another. This may be of particular importance in networks having some stations require low access delays. In this case, the arrangement shown in FIG. 3 may be further modified by permitting stations requiring low access times to automatically reserve slots every cycle, regardless of whether those stations will use the slots. In this arrangement, if a station has already reserved a slot, it will be able to transmit a data packet at any time up to its data packet slot, and therefore access delay is decreased. The station would always be able to transmit in the current cycle, rather than wait for the next.

The disadvantage of this is that each station must then be able to detect whether a station which has automatically reserved a slot is actually going to apply a data packet to the cycle and, if not, to advance its own transmission of data accordingly. There may therefore be longer delays between one data packet and the next during the data phase 111.

Figure 4:
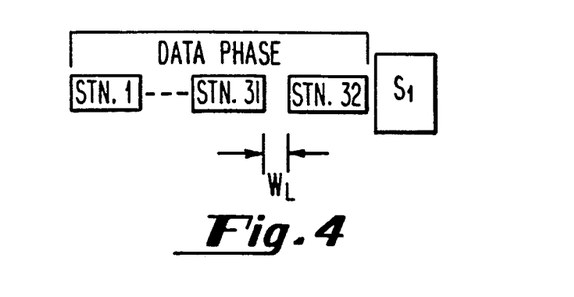
FIG. 4 shows a third alternative cycle of a system according to the present invention.

Indeed, this process may be taken further, as shown in FIG. 4. In this arrangement, there are no reservation slots, and each station is permitted to transmit a data packet at a predetermined point in the cycle. If a station recognizes that the previous station, and indeed any station preceding that, is not going to transmit a data packet during the cycle, then it may advance the timing of its transmission of data accordingly; in this case, where the middle of three stations has nothing to transmit the gap at central node 101 between the packets from the other stations will be at least $F_{min}$. Note that since each station does not know in advance which stations have data to transmit, the only circumstance in which it may start transmitting prior to having finished receiving a packet is when the station recognizes that the packet it is receiving is from the station immediately preceding it in the predetermined order.

The arrangement shown in FIG. 4 reduces the maximum access delay, and the implementation is simpler. However, there is a reduction in the utilization efficiency because of the potential increased delay between one data packet and the next. Furthermore, in any practical system, in order to ensure synchronization of all stations to the system cycle, there must be some transmissions in each cycle, even if no stations have data to send. This could be managed, for example, by requiring each station with no data to send to transmit an empty packet of length $F_{min}$ or less, thereby flagging progress of the cycle to all other stations. Alternatively, whenever a station recognizes that its successor has not transmitted a packet it must do so itself even if the packet is empty.

Figure 5:
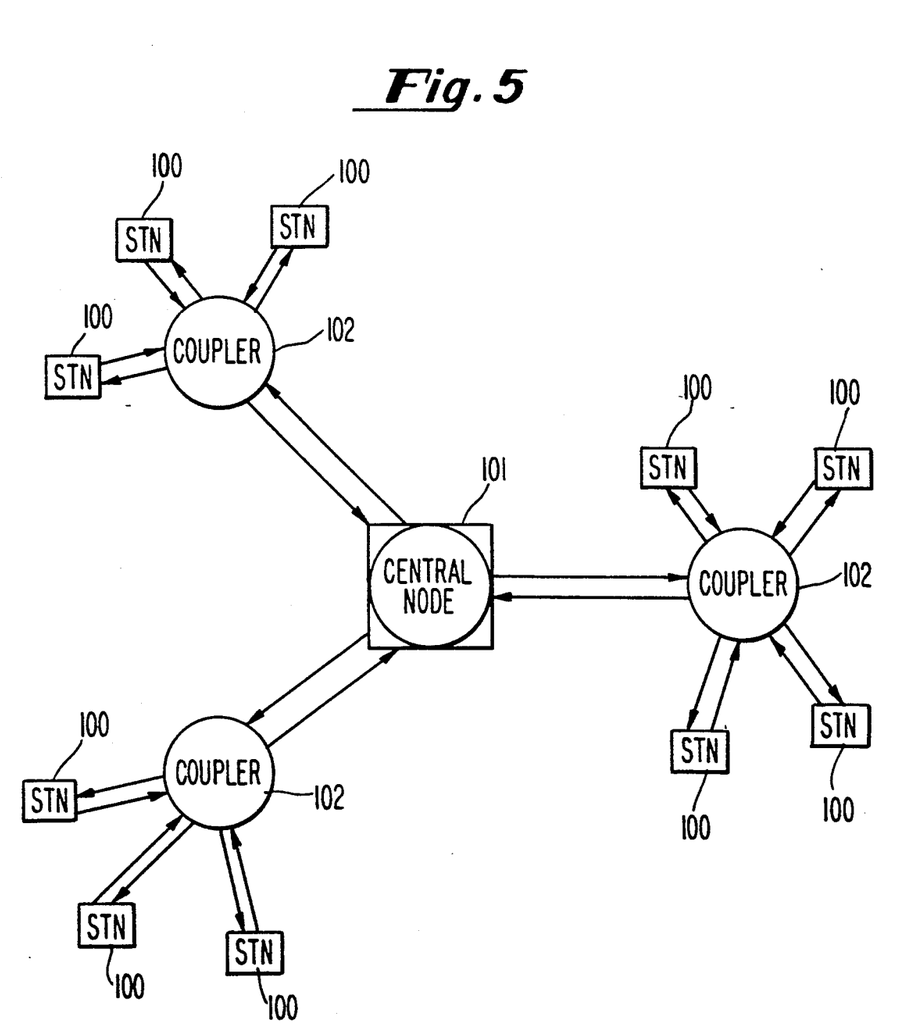
FIG. 5 is a block diagram of a star network with couplers linking groups of stations to the central node.

FIG. 5 shows a modified star network in which couplers 102 have been introduced between the stations 100 and the central node 101 to reduce the data flow paths. Thus, to transmit a data packet from one station to another station, data is transmitted from the first station to the immediate adjacent coupler 102, from that Coupler 102 to the central node 101, from that central node 101 to the coupler 102 of the destination station, and then to the destination station itself.

Figure 6A:
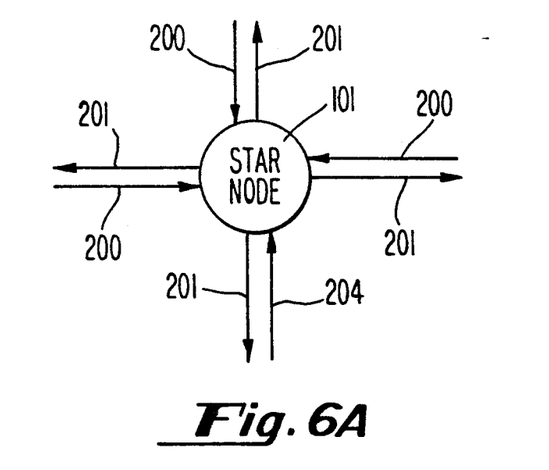
FIG. 6A shows data paths of the central node of the networks depicted in FIGS. 1 and 5.
Figure 6B:
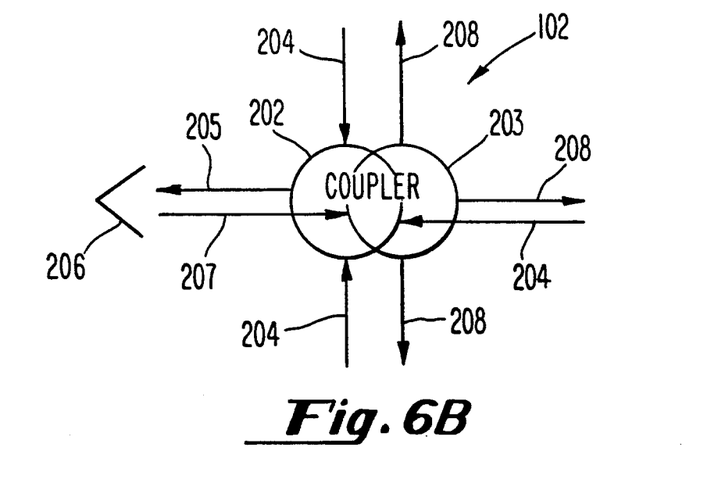
FIG. 6B shows data paths of the couplers of the network depicted FIG. 5.

In order to maintain the topography of the network (a central star node through which all packets are routed), each coupler 102 is constructed differently from the central node 101 (shown in FIG. 6A). More particularly, as is illustrated in FIG. 6B, each coupler has two parts, 202 and 203. Part 202 receives data packets and other signals from the stations 100 via lines 204 and transmits them via line 205 to central node 101, whose direction is indicated by the arrow 206. Similarly, part 203 receives data packets and other signals from the central station 111 via line 207 and relays those signals to the stations via lines 208. It can thus be seen that signals coming from the stations are routed to the central node 101 only and do not collide with the signals coming from the central node 101. Note that the timing criteria for avoiding collisions at the central node 101 previously discussed with respect to the network shown in FIG. 1 will still apply.

Although it is possible for the above described network to be operated with all stations 100 being started at the start-up of the network, it is also possible for a station 100 to join the network after it is running. Once the station has established the timing of the cycle, it can reserve a slot (e.g., the last empty slot) in the reservation phase of the cycle, and then use its reserved slot in the data phase to signal to the central node 101 that it has joined the network. The central node 101 can then determine a position for that station in the predetermined order of transmission, and the station can then operate normally. Such an arrangement does, of course, require the central node to be provided with intelligence; alternatively, one of the stations 100 can perform this role.

The above described network arrangement permits stations to regain quickly synchronization following errors on the network, with minimum data loss. There are several different errors possible. Firstly, the header of each packet should contain information defining the length of the packet, the station which originated the packet, and the address of the station which is to receive the packet. Failures in the addresses can be detected readily by known systems. Errors in the information defining the length of the packet will cause more problems. A station may interpret this information to mean that a packet from an earlier station is shorter than it really is. If this occurs, and the station is the next to transmit, it will begin to transmit prematurely, and the packets will collide. There will therefore be no gap between the packets from those stations, and the station which is next to transmit will not recognize that a new packet has started. That subsequent station will interpret the collided packets as being from the first of the stations which originated the collided packets, and therefore will wait for the packet from the other station to arrive. If, however, the maximum packet length is exceeded, the subsequent station can then automatically begin to transmit. Therefore, only two packets are corrupted and the error does not propagate further in the network. If a station determines that a packet is longer than it really is, no collision or corruption occurs, and there is only a lengthened delay before transmission.

Errors can also occur in setting the reservation slots. If a reservation slot is apparently set when no real reservation has been made, a delay will be caused but will not corrupt data. If, however, a station makes a reservation which is not detected by one or more other stations, problems can occur. Consider the situation in which a station A fails to recognize a reservation made by station B. If station A does not have data to transmit in the current cycle, it will merely see a cycle longer than it had expected. No data loss will occur. If station A does have data to transmit in the current cycle, and is arranged to transmit its data packet in the cycle before station B, station A will again see a cycle longer than it expected but no data loss will occur. If station A has data to transmit in the current cycle and is arranged to transmit its data packet immediately after station B, a collision will occur. The situation will then be the same as discussed previously for errors in the header length, with a collision between two data packets occurring, those two data packets being lost, but subsequent stations being unaffected after a delay. The situation is similar if station A is to transmit in the current cycle, and is arranged to transmit its data packet in the cycle some time, but not immediately, after station B. In this case a packet from station A will collide with another packet, but not with a packet from station B.

Errors can also occur in the acknowledgement slots. If acknowledgement does not occur the packet is re-transmitted and provided the probability of this is arranged to be low by suitable protocols, then the delays imposed on the system are not great. The situation where a packet is unsuccessfully transmitted and the appropriate acknowledgement bit it set is more rare because it depends on two errors, the probability of which is sufficiently low to be ignored.

Although in the embodiments of the invention described above each station is only allowed to transmit one data packet (of fixed or variable length) each cycle, it is possible to arrange for a station to transmit several packets during its turn (or slot) in the data phase of one cycle provided that an appropriate mechanism is established enabling the station next to transmit in the cycle to made a prejudgment regarding the end of data transmission by the station. Such a mechanism may either be by establishing a predetermined structure for data from the station so that the next station can be pre-programmed with this information, or by including information on the amount of data being transmitted, or the amount remaining to be transmitted, within the data itself.

Another possible refinement is to arrange for a station to have two or more associated slots for transmitting in the data phase of a cycle thereby enabling it to transmit more than once in the cycle. Such an arrangement is conceptually equivalent to having two or more stations at the same station address but each with its own slot in the cycle.

Figure 7A:
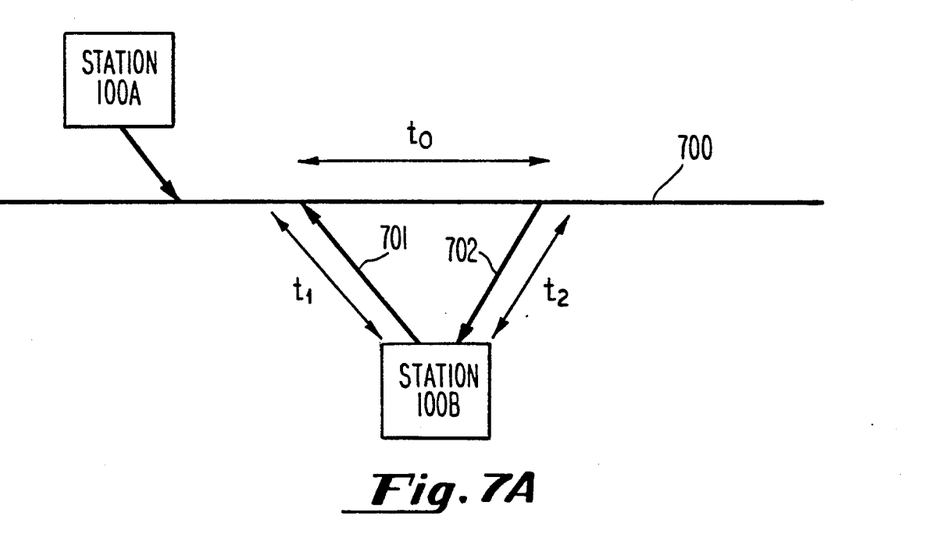
FIGS. 7A and 7B are diagrams of the signal paths near a station in a general network.
Figure 7B:
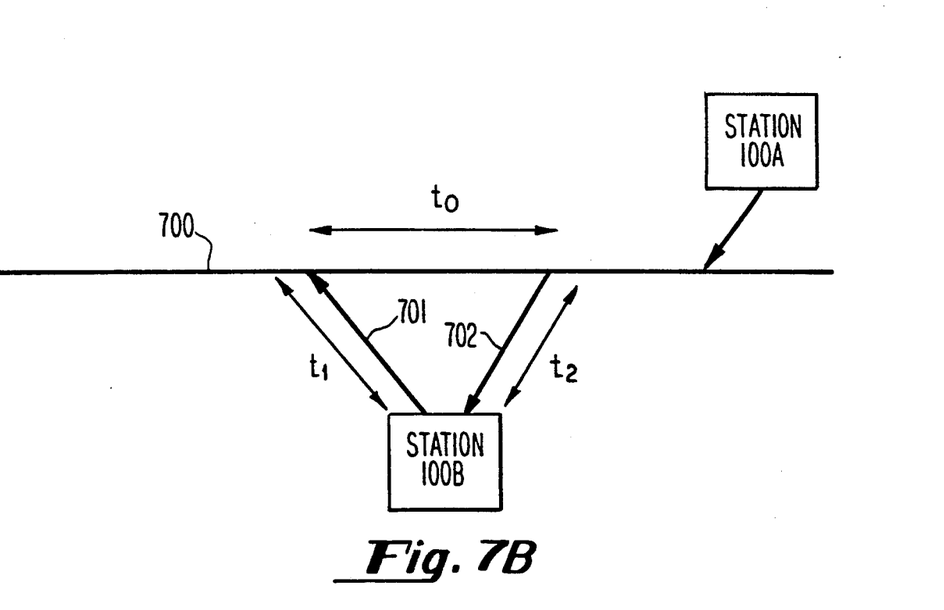
Figure 8:
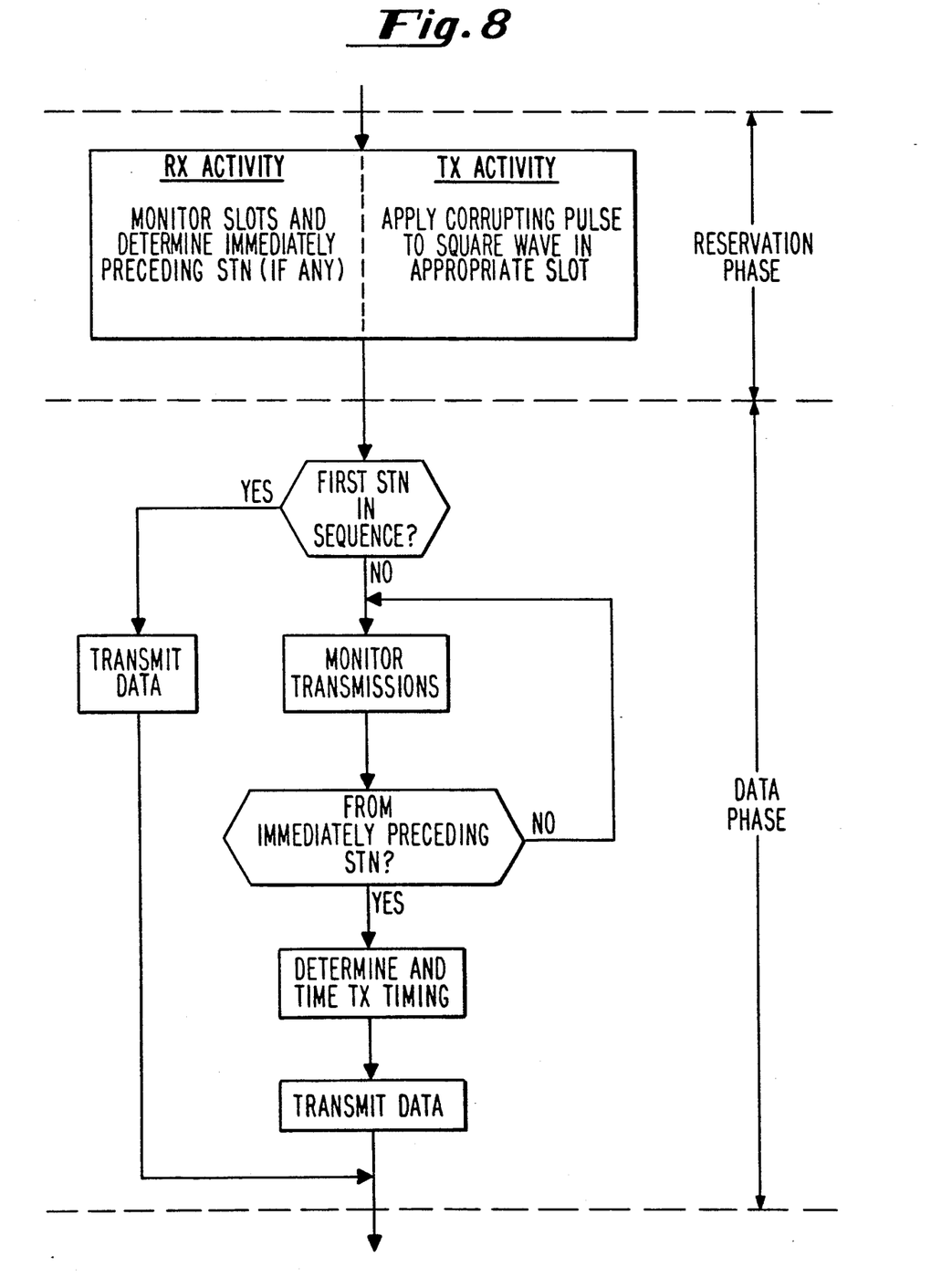
FIG. 8 is a flow chart of the FIG. 2 protocol implementation.

For embodiments of the present invention that utilize non-star topologies, the maximum time which a station can advance its transmission relative to the end of receipt of data from the immediately preceding transmitting station is required to be expressed in more general terms than the round-trip delay time between a station and a central node. FIG. 7 illustrates the main factors to be considered in deriving a maximum advance value.

In FIG. 7A, stations 100A and 100B are two successively transmitting stations in a cycle (station 100B transmitting after station 100A), path 700 is a common data path taken by packets transmitted by stations 100A, 100B on their way to other stations in the network, path 701 is the outward signal path from station 100B, and path 702 is the inward signal path to station 100B. Time $t_0$ is the time taken for a signal to travel the length of the common path 700 between its junctions with paths 701 and 702, time $t_1$ is the time taken for a signal to travel the length of the path 701, and time $t_2$ is the time taken for a signal to travel the length of the path 702. For a packet transmitted by station 100B not to collide with a preceding packet transmitted by station 100A, the maximum advance that station 100B can apply is $t_1 + t_0 + t_2$. At this advance the front of the packet from station 100B will join the common path 700 just after the end of the packet from station 100A has passed the junction of path 701 with the common path 700. However, if station 100A is in fact positioned as shown in FIG. 7B, then the maximum advance can only be $t_1 - t_0 + t_2$, which could be negative, indicating that station 100B needs to delay sending out its data packet beyond the time it detects the end of the packet from station 100A. Of course, the position of station 100A relative to paths 701 and 702 will frequently not be known to station 100B so that the worst case must be assumed.

For certain topologies it is possible to derive simplified expressions for the maximum advance. One such case is a star topology. Thus for the network of FIG. 1, the maximum advance is $t_1 + t_2$ as $t_0$ will be substantially zero. For the network shown in FIG. 5, in the case where stations 100A and 100B are connected to the same coupler 102 and the common path 700 extends from the coupler to the central node and back, the station 100A will in fact always be in the relationship of FIG. 7A to station 100B, so that the maximum advance is $t_1 + t_0 + t_2$, which is equivalent to the round trip delay from station 100B to the central node. Other relative positions of stations 100A and 100B in the network of FIG. 5 produce the same result.

Although preferred embodiments of the invention have been described, many variations and modifications of the specific embodiments described will be within the scope of the invention. Accordingly, reference should be made to the following claims to determine the true scope of the invention.

What is claimed is:

1. A communications system arranged to operate in cycles, comprising a plurality of stations interconnected by transmission paths, each station being permitted to transmit data during each cycle in a predetermined order of permitted transmissions, each data transmission including identity information indicative of the identity of the transmitting station, at least one of said stations comprising:

(a) first means for determining whether said at least one station is a first station in a sequence of stations with data to transmit in a given cycle; and (b) second means for determining when said at least one station is a next station with data to transmit, including means for receiving data transmissions and identifying an originating station, and means for transmitting data in said given cycle at a timing dependent upon the actual reception of transmissions in said given cycle from an immediately preceding station in said order of permitted transmissions, this timing being in advance of when said at least one station has finished receiving data from said immediately preceding station and being judged by said at least one station to avoid its data transmission colliding at any other station with a data transmission from said immediately preceding station.

2. A communication system according to claim 1, wherein said second means comprises:
(i) ascertaining means for ascertaining the time to the end of data reception from said immediately preceding station; and
(ii) means for initiating transmission of data at a time preceding said end of data reception by an amount of time no greater than the time $t = t_1 + t_0 + t_2$, where:
$t_1$ is the time required for data transmitted by said at least one station to travel from said at least one station along an outward transmission path to a common path used by said immediately preceding station in transmitting its data to all other stations but said at least one station;
$t_2$ is the time required for data transmitted by said immediately preceding station to travel from said common path to said at least one station along an inward transmission path; and
$t_0$ is the time required for data transmitted from said immediately preceding station to travel from said outward path to said inward path along said common path, $t_0$ being negative when the data transmitted from said immediately preceding station reaches said inward path before said outward path.

3. A communications system according to claim 2, wherein each station comprises means for transmitting a fixed amount of data during each cycle that it transmits data; and said ascertaining means further comprises means for determining the progress of reception of data from said immediately preceding station, said time ascertained on the basis of said progress and a prior knowledge of the size of said fixed amount of data.

4. A communication system according to claim 2, wherein:
said immediately preceding station comprises means for transmitting its data to include an indicator of the amount of data being transmitted; and
said ascertaining means further comprises means for determining the progress of reception of data from said immediately preceding station, said time ascertained on the basis of said progress and said indicator of the amount of data being transmitted.

5. A communications system according to claim 1, wherein said plurality of stations are interconnected in a star network via a central node, said at least one station comprising means for initiating transmission of its data at a time preceding an end of data reception by an amount of time no greater than the round trip time required for data transmitted from said at least one station to return to said at least one station via said central node.

6. A communications system according to claim 2, wherein:
each cycle has an initial reservation phase and each station comprises means for providing a reservation indication in a corresponding reservation time slot if it is to transmit data in that cycle; and
said at least one station further comprises means for:
(i) monitoring said reservation indications to identify said first station in said sequence, (ii) determining the identity of said immediately preceding station in said sequence, and (iii) determining when it is the station next to transmit by identifying the receipt of data from said immediately preceding station.

7. A communications system according to claim 6, wherein said at least one station comprises means to begin transmitting data, when not said first station in said sequence, before it has finished receiving data from said immediately preceding station in said sequence regardless of whether said immediately preceding station is also the station immediately preceding said at least one station in said order of permitted transmission.

8. A communications system according to claim 6, wherein at least one of said stations comprises means to always indicate in its corresponding reservation time slot that it is to transmit data, irrespective of whether it knows, at the time of said reservation phase, if it is to transmit data during that cycle.

9. A communications system according to claim 6, wherein each cycle has an acknowledgement phase and said at least one station comprises means for indicating, when it receives data from a second station, that reception in an acknowledgement time slot corresponding to said second station.

10. A communications system according to claim 1, wherein said second means comprises means for determining progress through said cycle in said predetermined order of transmission by identifying each station transmitting earlier in said cycle by its transmission, and by judging that a next station in said order is not going to transmit during said cycle upon a transmission not being received from that station during a predetermined period following the end of reception of data transmitted from the station immediately preceding said next station in said order.

11. A communications system according to any one of claims 2 to 4, wherein said plurality of stations are interconnected in a star network via a central node, said at least one station comprising means for initiating transmission of its data at a time preceding said end of data reception by an amount of time no greater than the round trip time required for data transmitted from said at least one station to return to said at least one station via said central node.

12. A communications system according to any one of claims 3 to 5, wherein:
each cycle has an initial reservation phase and each station comprises means for providing a reservation indication in a corresponding reservation time slot if it is to transmit data in that cycle; and
said at least one station further comprises means for:
(i) monitoring said reservation indications to identify said first station in said sequence, (ii) determining the identity of said immediately preceding station in said sequence, and (iii) determining when it is the station next to transmit by identifying the receipt of data from said immediately preceding station.

13. A communications system according to claim 12, wherein said at least one station comprises means to begin transmitting data, when not said first station in said sequence, before it has finished receiving data from said immediately preceding station in said sequence regardless of whether said immediately preceding station is also the station immediately preceding said at least one station in said order of permitted transmission.

14. A communications system according to claim 12, wherein at least one of said stations comprises means to always indicate in its corresponding reservation time slot that it is to transmit data, irrespective of whether it knows, at the time of said reservation phase, if it is to transmit data during that cycle.

15. A communications system according to claim 12, wherein each cycle has an acknowledgement phase and said at least one station comprises means for indicating, when it receives data from a second station, that reception in an acknowledgement time slot corresponding to said second station.

16. A communications system according to any one of claims 2 to 5, wherein said second means comprises means for determining progress through said cycle in said predetermined order of transmission by identifying each station transmitting earlier in said cycle by its transmission, and by judging that a next station in said order is not going to transmit during said cycle upon a transmission not being received from that station during a predetermined period following the end of reception of data transmitted from the station immediately preceding said next station in said order.

17. A method of operating a communications system having a plurality of stations arranged to operate in cycles, comprising the steps of:
  (a) determining an order of permitted transmission of data from said stations, and requiring each data transmission from at least one of said stations to include identity information indicative of the identity of the transmitting station;
  (b) determining a first station in a sequence of stations with data to transmit in a given cycle, and transmitting data from said first station;
  (c) determining a next station with data to transmit, and transmitting data in said given cycle from said next station at a timing depending upon the actual reception of transmissions from an immediately preceding station in said order of permitted transmissions, this timing being in advance of an end of transmission in said given cycle by said immediately preceding station in said sequence of stations and at a time before said next station has finished receiving data from said immediately preceding station, said time judged to avoid the data transmitted by said next station colliding at any other station with data transmitted from said immediately preceding station.

18. The method recited in claim 17, wherein step (c) further comprises:
  (i) ascertaining the time to the end of data reception by said next station; and
  (ii) initiating transmission of data by said next station at a time preceding said end of data reception by an amount of time no greater than the time $t = t_1 + t_0 + t_2$, where:
    $t_1$ is the time required for data transmitted by said next station to travel from said next station along an outward transmission path to a common path used by said immediately preceding station in transmitting its data to all other stations but said next station;
    $t_2$ is the time required for data transmitted by said immediately preceding station to travel from said common path to said next station along an inward transmission path; and
    $t_0$ is the time required for data transmitted from said immediately preceding station to travel from said outward path to said inward path along said common path, $t_0$ being negative when data transmitted from said immediately preceding station reaches said inward path before said outward path.

19. The method recited in claim 18, wherein:
  each station is arranged to transmit a fixed amount of data during each cycle that it transmits data; and
  step (c) (i) further comprises determining the progress of reception of data from said immediately preceding station, said time ascertained on the basis of said progress and a prior knowledge of the size of said fixed amount of data.

20. The method recited in claim 18, further comprising the steps of:
  transmitting an indicator of the amount of data being transmitted, if the amount of data being transmitted is variable; and
  determining the progress of reception of data from said immediately preceding station, said time ascertained on the basis of said progress and said indicator of the amount of data being transmitted.

21. The method recited in claim 17, wherein, if said plurality of stations are interconnected in a star network via a central node, said next station initiates transmission of its data at a time preceding said end of data reception by an amount of time no greater than the round trip time required for data transmitted from said at next station to return to said next station via said central node.

22. The method recited in claim 18, wherein each cycle has an initial reservation phase during which each station is operative to provide a reservation indication in a corresponding reservation time slot if it is to transmit data in that cycle; and further comprising the steps of: (i) monitoring said reservation indications to determine said first station in said sequence, (ii) determining the identity of said immediately preceding station in said sequence, and (iii) determining said next station to transmit by identifying the receipt of data from said immediately preceding station.

23. The method recited in claim 22, wherein said next station, when not said first station in said sequence, transmits data before it has finished receiving data from said immediately preceding station in said sequence regardless of whether said immediately preceding station is also the station immediately preceding said next station in said order of permitted transmission.

24. The method recited in claim 22, wherein at least one of said stations is operative to always indicate in its corresponding reservation time slot that it is to transmit data, irrespective of whether it knows, at the time of said reservation phase, if it is to transmit data during that cycle.

25. The method recited in claim 22, wherein each cycle has an acknowledgement phase during which each station that receives data from another station is operative to indicate that reception in an acknowledgement time slot.

26. The method recited in claim 17, wherein step (c) further comprises determining progress through said cycle in said predetermined order of transmission by identifying each station transmitting earlier in said cycle by its transmission, and by judging that a next station in said order is not going to transmit during said cycle upon a transmission not being received from that station during a predetermined period following the end of reception of data transmitted from the station immediately preceding said next station in said order.

* * * * *